June 23, 1964 — R. W. SMITH — 3,138,079
APPARATUS FOR FORMING STRIPS OF PAVEMENT
Filed Oct. 19, 1960 — 2 Sheets-Sheet 1

INVENTOR:
ROY W. SMITH
BY Eaton, Bell, Hunt & Seltzer
ATTORNEYS

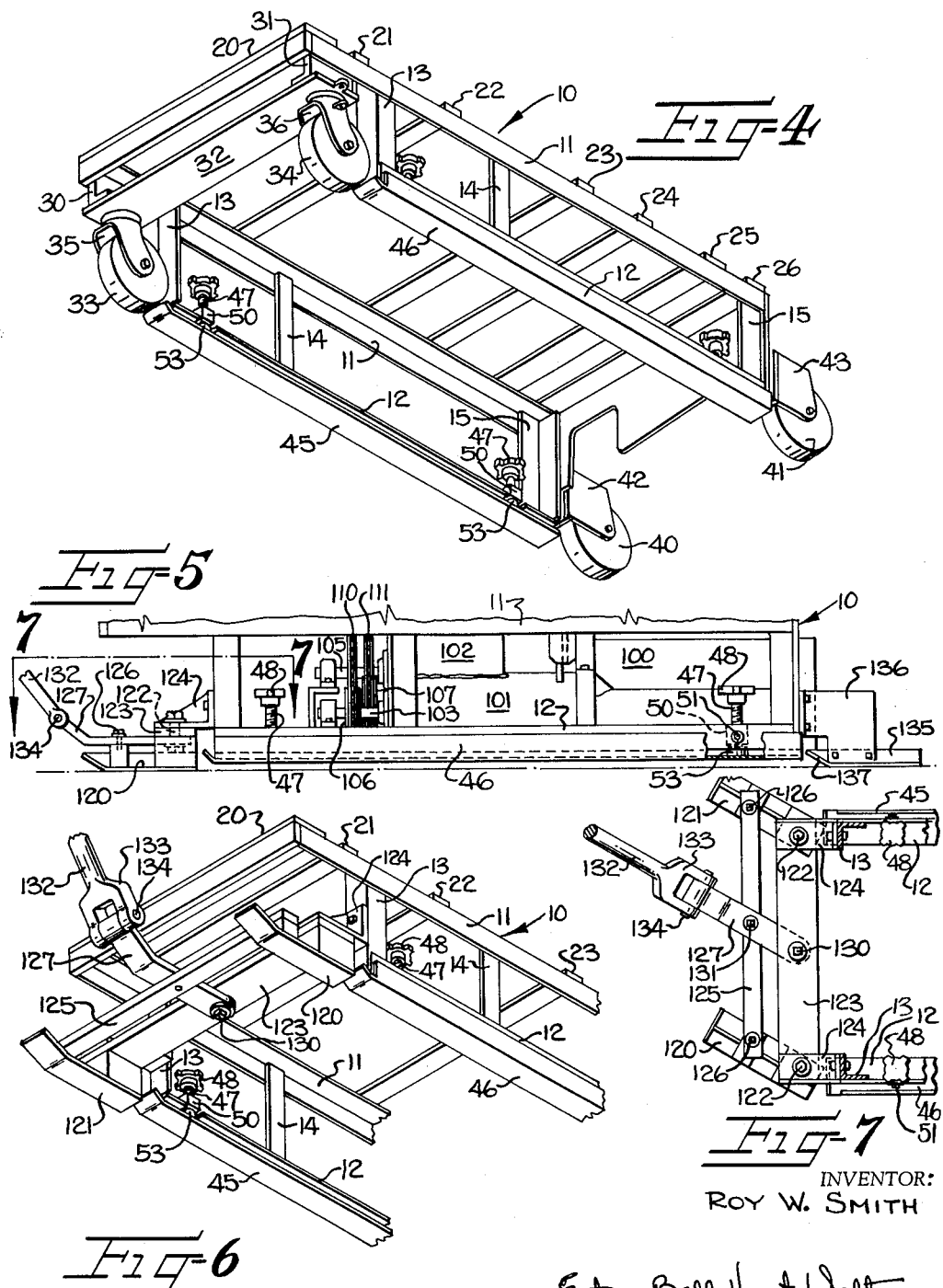

United States Patent Office 3,138,079
Patented June 23, 1964

3,138,079
APPARATUS FOR FORMING STRIPS OF PAVEMENT
Roy W. Smith, Salisbury, N.C., assignor to Power Curbers, Inc., Salisbury, N.C., a corporation of North Carolina
Filed Oct. 19, 1960, Ser. No. 63,608
3 Claims. (Cl. 94—46)

This invention relates to curb and pavement laying machines and is particularly concerned with improvements in curb laying machines of the character disclosed in a patent to William E. Canfield, Patent No. 2,707,422, issued on May 3, 1955, and a patent to William E. Canfield and Roy W. Smith, Patent No. 2,818,790, issued on January 7, 1958.

The machine disclosed in Patent No. 2,707,422 generally comprises a horizontally disposed tube above one end of which a hopper is disposed and within which a driven screw is disposed for propelling and compressing the paving material, directed into the tube from the hopper, rearwardly through said tube. The rear end of the tube has an elongated mold connected thereto and communicating therewith, the mold having an open bottom and an open rear end whereby the paving material extruded by the screw from the tube is formed according to the shape of the mold and molded upon the surface upon which the machine is positioned so the machine is propelled due to the thrust of the screw in compressing the paving material.

The machine disclosed in the Patent No. 2,818,790 generally comprises a first horizontally disposed tube above one end of which a hopper is disposed and within which a driven screw is disposed for propelling and compressing the material, directed into the tube from the hopper, rearwardly through said tube. A manifold is positioned at the end of said first tube to receive the paving mixture from the first tube and communicates with a second plurality of tubes disposed on a lower level than the first tube. Each of the second plurality of tubes also having a driven screw therein for compacting and extruding paving material therefrom and the rear ends of these tubes communicate with a common open-bottom mold which is open at its rear end whereby relatively wide or expansive sections of paving may be molded thereby.

Both of the machines disclosed in the patents aforementioned, are provided with wheels which are vertically adjustable so that the frame of the machine may be lowered into contact with the ground to provide a braking force which allows the density of the paving material in the paving strips to be controlled. The contact of the frame of the machine with the surface has a deleterious effect on the lower portion of the frame in that the frame has a tendency to wear away and also the amount of braking force applied can not be easily controlled since a large area of the frame is in contact with the ground. Also, since the mold is fixed to the frame, the changing of the distance at which the frame is supported above the surface also changes the relationship of the mold to the surface causing the paving strips to be of unequal heights.

It is an object of this invention to provide an improved machine for laying strips of pavement wherein a braking force is provided which is variable for controlling the forward movement of the apparatus and hence the density of the paving material in the strips.

A more specific object of this invention is to provide an improved machine for laying strips of paving material such as concrete, asphalt or the like having a brake which is adjustably mounted for contact with the surface whereby the amount of area of the brake in contact with the surface and also the force with which the brake is applied to the surface may be controlled with particularity.

Another object of this invention is to provide a machine for laying strips of paving material having a mold thereon wherein the mold is maintained in substantially the same relationship to the surface at all times, and wherein an apparatus is provided for giving a variable braking force to the machine whereby the forward movement of the machine and hence the density of paving material in the strips may be controlled with particularity.

Some of the objects of the invention having been stated, other objects will appear as the description proceeds when taken in connection with the accompanying drawings, in which—

FIGURE 4 is a perspective view looking at the bottom of the frame portion of the apparatus of the present invention;

FIGURE 5 is a side elevation partially in section and with portions broken away of a modified form of the apparatus;

FIGURE 6 is a perspective view looking at the bottom with portions broken away of the apparatus shown in FIGURE 5; and FIGURE 7 is a transverse section along line 7—7 of FIGURE 5 with portions broken away.

Figure 1:
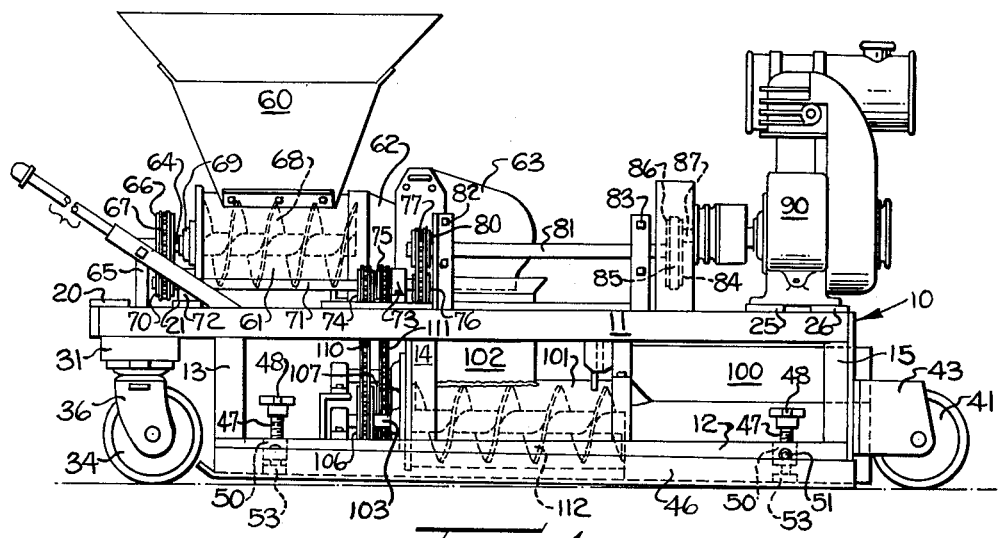
FIGURE 1 is a side elevation of the improved apparatus.
Figure 2:
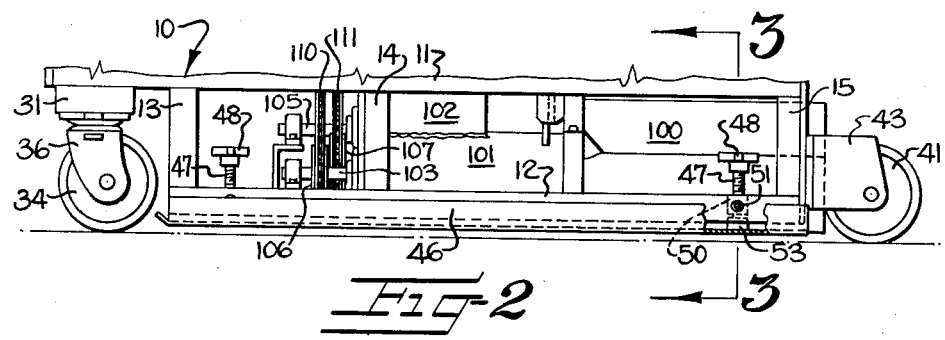
FIGURE 2 is a side elevation with portions partly in section and with portions broken away of the apparatus shown in FIGURE 1.
Figure 3:
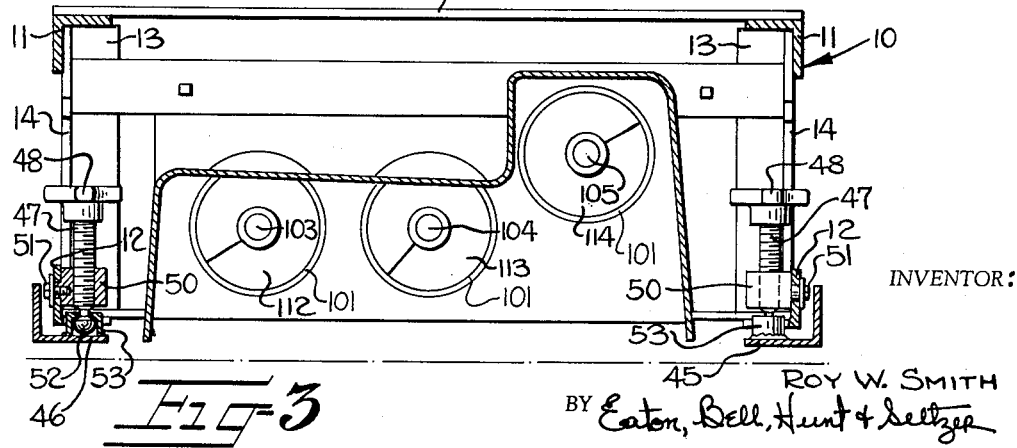
FIGURE 3 is a transverse section taken substantially along line 3—3 in FIGURE 2.

Referring more specifically to the drawings, and particularly to FIGURE 4, the apparatus comprises a frame 10 having two sets of upper and lower longitudinal side frame members 11, 12 which are secured in spaced relation to each other by upright frame members 13, 14 and 15. The upper longitudinal frame members 11 are joined together by cross-bars or transverse frame members 20 to 26, inclusive.

The front portions of the upper longitudinal frame members 11 have depended therefrom a pair of brackets 30, 31 with the lower portions thereof connected by a transverse member 32. The front portion of the frame 10 is normally supported in spaced relation above the surface over which it is adapted to be moved by a pair of caster wheels 33, 34. Caster wheels 33, 34 are suitably journaled between the legs of inverted substantially U-shaped caster frames 35, 36. Caster frames 35, 36 are mounted for rotational movement about a vertical axis on transverse frame member 32 to allow the apparatus to be guided in its movement over the surface.

The rear end of the frame 10 is supported in predetermined spaced relation above the surface by a pair of laterally spaced rear wheels 40, 41. Rear wheels 40, 41 are suitably journaled between the legs of bracket members 42, 43 which are fixed to the upright frame members 15.

A pair of brake members 45, 46 are depended from the lower side frame members 12 and extend for substantially the full length thereof. Brake members 45, 46 are adjustably mounted on the side frame members 12 by screws 47 which are threadably received in blocks 50. Blocks 50 are secured to the frame members 12 by bolts 51 which penetrate through the frame member 12 into the blocks 50. Screw members 47 are attached to the brake members 45, 46 by a ball 52 mounted on the lower end of screw members 47 which is received in a socket 53 mounted on the brake members. The ball and socket arrangement allows limited pivotal movement between the screw member 47 and the brake members 45, 46 to provide adjustment of either end of the brake members 45, 46 separate from the other end without binding of the screw members 47 in the blocks 50. A suitable hand wheel 48 is provided on the ends of screw members 47 opposite the brake members 45, 46 to allow the screw member 47 to be rotated in the block 50 for vertically adjusting the position of the brake members 45, 46 relative to the surface.

A suitable hopper 60 is provided for receiving the paving material and feeding the same to a first or upper conveying or extruding means 68. Hopper 60 has an open bottom which communicates with a first tube 61, to the upper portion of which the hopper 60 is suitably secured. The horizontally disposed first tube 61 is suitably secured to the central portions of the cross-bars 21, 22 and its open rear end has a substantially rectangular tubular extension or nozzle 62 communicatively connected thereto which is also open at its rear end. The open rear end of the tubular extension or nozzle 62 communicates with a suitable baffle 63 which directs the paving material downwardly.

Disposed within the first tube 61 is a screw-type conveyor 68 which is fixed on a shaft 64 extending into the first tube 61. The front portion of shaft 64 is journaled in a suitable bearing 69 fixed on the front surface of tube 61 and in a suitable bearing fixed on a bearing stand 65 secured to the cross-bar 20. The front portion of shaft 64 has a sprocket wheel 66 fixed thereon which is engaged by an endless sprocket chain 67 which also engages a sprocket wheel 70. Sprocket wheel 70 is fixed on the front end of a horizontally disposed jack-shaft 71 journaled in bearing blocks 72, 73 suitably secured to the frame 10. The rear portion of shaft 71 has sprocket wheels 74, 75 and 76 fixed thereon.

Sprocket wheel 76 is engaged by a sprocket chain 77 which also engages a sprocket wheel 80 fixed on the front end of a drive shaft 81. Shaft 81 is journaled in a pair of spaced bearing blocks 82, 83 which are suitably secured to the frame 10. The rear end of shaft 81 has a pulley 84 fixed thereon which is engaged by an endless belt 85 which also engages a pulley 86 fixed on motor shaft 87 of a suitable motor 90, shown in the form of an internal combustion engine supported on the frame member 10.

The paving material is formed into a strip in a suitable mold 100 which is mounted on the frame 10 at the lower side of frame members 12. The paving material is moved from the rear portion of tube 61 by lower tubes 101 which have a hopper portion 102 communicating with the baffle 63 on the rear nozzle portion 62 of tube 61. A plurality of screw-type conveyors or extruding means 112, 113 and 114 are provided in tubes 101 for moving the paving material rearwardly into molds 100. Extruding means 112, 113, 114 are driven by shafts 103, 104 and 105, respectively. Shafts 103 and 104 are driven by sprockets 106 and 107 which are driven from the sprockets 74 and 75 by suitable chains 110 and 111. Shaft 105 is driven by jack-shaft 71 by suitable chains and sprockets, not shown.

Referring now to FIGURES 5–7, wherein the brake members are shown on a modified apparatus wherein short skid members are used in place of the wheels, the forward portion of frame member 10 is supported by a pair of skid members 120, 121 having upwardly inclined front ends. Skids 120, 121 are pivotally connected by pivot pins 122 to a frame member 123. Frame member 123 is fixed to the upright frame members 13 by brackets 124. The forward portion of skid members 120, 121 are connected together by a bar member 125 connected thereto by suitable pivotal connections 126. The pivotal connections 126 comprise bolt members extending through the bar member 125 and into the skids 120, 121 with a loose connection between the bolt member 126 and the bar member 125.

A tongue member 127 is pivotally connected to member 123 and bar member 125 by suitable pivot pins 130, 131. The tongue member 127 is adapted to pivot about the pivot pin 130 to guidably move the bar member 125 either to the right or to the left to cause the skids 120, 121 to pivot about their pivot pins 122 for guiding the apparatus over the surface. A suitable handle member 132 is connected to the tongue member 127 by a bracket 133 and a pin 134 for moving the tongue member about its pivot 130.

The rear portion of the frame 10 is supported by skid members 135 which are fixed to the upright frame members 15 by suitable brackets 136. The skid members 135 are inclined at their forward edges at 137 to keep the forward end portion thereon from digging into the surface to allow the skid to move smoothly over the surface.

In operation, the paving material is placed in the hopper 60 where it is fed downwardly into the tube 61. The extruding means or screw-type conveyor 68 moves the paving material rearwardly in the tube 61 through the nozzle 62. As the paving material leaves the nozzle 62, it is directed downwardly by the baffle 63 into the hopper 102. The hopper 102 communicates with the tubes 101 and transfers the paving material from the baffle 63 into the tubes 101. The paving material is moved rearwardly in the tubes 101 into the mold 100 by the extruding means 112, 113, 114 packing the material into the mold. The action of the paving material being moved into the mold against the packed material already in the mold serves to move the apparatus over the surface.

The brake members 45, 46 are moved into contact with the surface for controlling the forward movement of the apparatus over the surface to thereby provide a control of the density of the paving material in the strips at any given time. When the forward speed of the apparatus and hence the density of the material in the mold is desired to be changed, the screw members 47 are turned by rotating the hand wheels 48 for moving the screws downwardly in the blocks 50. The screw members 47 carry the brake members 45, 46 downwardly into engagement with the surface which provides a frictional force retarding the forward movement of the apparatus over the surface. This retardation of the forward movement of the apparatus requires that a greater force be applied by the paving material moving into the mold to move the apparatus forwardly thereby giving a higher density of paving material in the strips which are laid by this apparatus.

The retarding or braking force applied by the brake members 45, 46 may be minutely controlled by the use of the screw members 47. As aforementioned, the brake members 45, 46 are mounted for limited pivotal movement on the ends of screw members 47 by the ball and socket arrangement 52, 53. This limited pivotal movement allows the rear portion of either the brake member 45 or the brake member 46 to be adjusted independently of the forward portion thereof. For instance, if merely a slight retarding or braking force is desired, the rear portion of brake members 45, 46 may be lowered into engagement with the surface while the forward portion is kept in a raised position (FIGURE 1) thereby giving a limited amount of area of the brake members 45, 46 in engagement with the surface. As the need for a larger braking force arises, more area of the braking members 45, 46 may be placed into engagement with the surface by lowering of the forward portion of the brake members 45, 46.

The amount of pressure applied to the brake members 45, 46 may also be controlled through the use of the screw members 47. Once the brake members 45, 46 are in engagement with the surface, the amount of pressure applied to the surface by the brake members may be increased by merely turning the screw members 47 further in the same direction and allowing more weight of the apparatus to be transferred from the wheels or skid members to the brake members 45, 46.

The individual adjustment of brake members 45, 46 allows either one of the brake members to be moved into contact with the surface while the other brake member is maintained out of contact. Also, more area of one brake member may be placed in contact with the surface or more pressure may be exerted on one brake member than on the other which will tend to retard one side of the apparatus more than the other side. This will have a tendency to turn the apparatus and is especially useful when laying curbing around curves or corners.

The combination of the control of the amount of area of the brake members into engagement with the surface and the amount of pressure applied to the surface by the brake members gives a very accurate control of the braking or retarding force and thereby control of the forward movement and hence the density of the paving material in the strips to be formed by the apparatus.

In the drawings and specification there have been set forth preferred embodiments of the invention and, although specific terms are employed, they are used in a generic and descriptive sense only and not for purposes of limitation, the scope of the invention being defined in the claims.

I claim:

1. In an apparatus for forming strips of paving material such as curbs and the like on a supporting surface, said apparatus having a frame, a hopper mounted on said frame and adapted to receive paving material therein, an elongate mold mounted on said frame and having an open bottom and an open rear end, means for moving the paving material from said hopper into the mold and for packing the paving material into the mold to form the strips of paving material and to move the apparatus forwardly due to the pressure of the incoming material on the material within the mold; in combination therewith, means connected to said frame and adapted to contact the supporting surface for supporting said frame a predetermined distance above the supporting surface and for maintaining the mold in substantially the same relationship to the supporting surface at all times, at least one elongate brake member extending longitudinally of said frame and adapted to be moved into frictional contact with the supporting surface, and means vertically adjustably mounted on said frame adjacent each end of said brake member and pivotally connected to each end of said brake member for mounting said opposite ends of said brake member on said frame for independent selective vertical adjustment relative to said frame and into and out of contact with the supporting surface and for varying the area of said brake member in contact with the supporting surface to vary the braking force applied to the apparatus.

2. The structure set forth in claim 1 wherein said brake member mounting means comprises a pair of rotatable screws threadably mounted on said frame for vertical adjustment relative thereto upon rotation of said screws, a ball mounted on the lower end of each of said screws and cooperating socket means mounted on said brake member beneath said screws and partially surrounding said balls thereon.

3. In an apparatus for forming strips of paving material such as curbs and the like on a supporting surface, said apparatus having an elongate frame, a hopper mounted on said frame and adapted to receive paving material therein, an elongate mold mounted on said frame and having an open bottom and an open rear end, means for moving the paving material from said hopper into the mold and for packing the material into the mold to form the strips of paving material and for moving the apparatus forwardly due to the pressure of the incoming paving material on the material within the mold; in combination therewith, means connected to said frame and adapted to contact the supporting surface for supporting said frame a predetermined distance above the supporting surface for movement thereover and for maintaining the mold in substantially the same relationship to the supporting surface at all times, a pair of elongate brake members disposed at opposite sides of said frame and extending longitudinally thereof and having up-turned front end portions, a pair of rotatable screws for each of said elongate brake members, said screws being threadably mounted on said frame adjacent opposite ends of said elongate brake members for vertical adjustment relative to said frame upon rotation of said screws, a ball mounted on the lower end of each of said screws, socket means mounted on said elongate brake members beneath each of said screws and partially surrounding said balls and cooperating therewith to provide a universal connection between said screws and said elongate brake members, and handle means mounted on the upper end of each of said screws for facilitating manual rotation of said screws for selective vertical adjustment of opposite end portions of each of said brake members relative to said frame and into and out of contact with the supporting surface for varying the area of said brake members in contact with the supporting surface to thereby vary the braking force applied thereby to the apparatus.

References Cited in the file of this patent

UNITED STATES PATENTS

| | | |
|---|---|---|
| 2,092,458 | Krout | Sept. 7, 1937 |
| 2,105,308 | Brickner | Jan. 11, 1938 |
| 2,128,889 | Allen | Sept. 6, 1938 |
| 2,225,015 | LeBelle | Dec. 17, 1940 |
| 2,353,501 | Redling | July 11, 1944 |
| 2,707,422 | Canfield | May 3, 1955 |
| 2,818,790 | Canfield et al. | Jan. 7, 1958 |
| 2,871,986 | Polovitch | Feb. 3, 1959 |
| 2,932,875 | Butcher | Apr. 19, 1960 |

FOREIGN PATENTS

| | | |
|---|---|---|
| 223,676 | Switzerland | Dec. 16, 1942 |
| 837,714 | Great Britain | June 15, 1960 |